(12) United States Patent
Leshay et al.

(10) Patent No.: US 6,389,568 B1
(45) Date of Patent: May 14, 2002

(54) METHOD AND APPARATUS FOR DETECTING HANDSHAKING PROTOCOL ERRORS ON AN ASYNCHRONOUS DATA BUS

(75) Inventors: Bruce A. Leshay, West Boylston; Dana Hall, Hopkinton, both of MA (US)

(73) Assignee: Maxtor Corporation, Longmont, CO (US)

(*) Notice: Subject to any disclaimer, the term of this patent is extended or adjusted under 35 U.S.C. 154(b) by 0 days.

(21) Appl. No.: 09/219,580

(22) Filed: Dec. 23, 1998

(51) Int. Cl.[7] .................................................. H04L 1/18
(52) U.S. Cl. ........................................ 714/749; 714/750
(58) Field of Search ................................ 714/748, 749, 714/750, 751, 746, 747, 740, 741, 74–45

(56) References Cited

U.S. PATENT DOCUMENTS

| | | | |
|---|---|---|---|
| 5,084,871 A | * | 1/1992 | Carn et al. ................... 370/462 |
| 5,159,684 A | * | 10/1992 | Kroll et al. |
| 5,544,311 A | * | 8/1996 | Harenberg et al. ............ 714/40 |
| 5,550,848 A | * | 8/1996 | Doshi et al. ................. 714/749 |
| 6,025,931 A | * | 2/2000 | Bloomfield ................. 358/402 |

* cited by examiner

Primary Examiner—David Ton
Assistant Examiner—Emeka J. Amanze
(74) Attorney, Agent, or Firm—Michael Zarrabian

(57) ABSTRACT

A circuit for monitoring and detecting data transfer protocol errors that occur during asynchronous transfer of data over a data bus. The circuit monitors bus request/acknowledge control lines in accordance with a predetermined handshaking protocol. In the event that an undefined or illegal logic state is detected on the data bus request or acknowledge control lines, the circuit provides an error value to the data sending entity. As a result of receiving this error value, the data sending entity can retry the data transmission over data bus.

14 Claims, 7 Drawing Sheets

METHOD AND APPARATUS FOR DETECTING HANDSHAKING PROTOCOL ERRORS ON AN ASYNCHRONOUS DATA BUS

FIELD OF THE INVENTION

The invention relates generally to a method and logic circuitry for detecting handshaking protocol errors that may occur during asynchronous transfer of data over a data bus. More particularly, the present invention relates to detecting handshaking protocol error conditions and communicating the error conditions to a data sender to enable a subsequent retry of the data transmission.

BACKGROUND OF THE INVENTION

As illustrated in FIG. 1, data is typically transmitted back and forth between a host computer system or initiator 10 and peripheral devices or targets, such as disk drives 5, tape drives 6, or printers 7, over a data communication bus 15. The data communication bus 15 couples the initiator 10 and the target devices 5, 6, and 7 together and enables the exchange of data between the system and the devices. One type of data communication bus is a Small Computer System Interconnect (SCSI) data bus. A SCSI data bus can be configured in different ways and has several modes of operation. One configuration and mode of operation is known as SCSI wide bus which includes a sixteen bit data bus with associated control signals such as Busy (BSY), Select (SEL), Control/Data (C/D), Input/Output (I/O), Message (MSG), Request (REQ), Acknowledge (ACK), Attention (ATN), and Reset (RST). The SCSI data bus is connected to the initiator 10 via a host adapter 12 and is connected to target devices 5, 6, and 7 via device controllers 8, 9, and 11. Each device controller is matched to the specific type of device connected to the SCSI bus as shown in FIG. 1. The SCSI data bus 15 may be configured to include a plurality of target devices daisy chained together, where both the initiator, and the last target device connected to the bus (furthest from the initiator) are terminated with a bus terminator 16. The bus terminator 16 includes circuitry for regulating the maximum and the minimum voltage levels on the SCSI data bus 15.

Referring to FIGS. 1 and 2, when information is transferred back and forth between the initiator 10 and any one of the plurality of target devices 5, 6 and 7, a handshaking protocol is used to control the transfer of data on the data bus 15 connected therebetween. When transferring data, for example, from the disk drive 5 to the host 10, the protocol commences the data transfer process by loading a data segment 40 on the data bus 15. The protocol then pauses for a period of time defined as the set-up time. The set up time generally provides a predetermined period of time for the data receiving entity to latch the data segment 40 previously loaded on to the data bus 15. Next, the disk drive target 5 asserts a REQ control signal 20 at a time A over a control line of the data bus 15. This REQ control signal 20 is received by the host initiator 10 and indicates to the initiator 10 that data (Data-1) is on the bus 15 and ready for transfer. The initiator 10 then latches the data and replies to the disk drive 5 with an assertion of an ACK control signal 30 at time B. This ACK control signal 30 indicates to the disk drive 5 that the initiator 10 has possession of the data segment 40. Some time after receiving the ACK control signal 30, e.g., at time C, the disk drive 5 deasserts the REQ control signal 20 for removing the data segment 40 from the data bus 15. The initiator 10 senses that the REQ control signal 20 has been deasserted and responds by deasserting the ACK control signal 30 at time D. The above described handshaking protocol steps are cyclically repeated for each successive data segment (byte or word) 40 loaded on the data bus 15 by the disk drive 5 during transfer of a plurality of data segments 40 from the disk drive target 5 to the host initiator 10.

Referring to FIG. 3, generally one problem can occur when either the initiator 10 detects a REQ control signal 20 that was not sent over the bus 15 by the disk drive 5 or the disk drive 5 detects an ACK control signal 30 that was not sent over the bus 15 by the host 10. These false detections of REQ/ACK control signals, 20 and 30 respectively, occur as a result of noise pulse(s) 35 being introduced to the data bus 15. Noise pulses 35 can be introduced to the data bus 15, e.g. at time E, as a result of the bus 15 being exposed to EMI or RFI signals or by virtue of signal reflections occurring as a result of bus impedance mismatch or incorrect termination. Specifically, noise signals that appear on the data bus 15 can occur due to impedance mismatches between the initiator 10 and target devices 5, 6 or 7, or impedance mismatches between each of the plurality of target devices 5, 6 and 7. These noise pulses 35 are problematic to the handshaking protocol established between the initiator 10 and the target devices 5, 6 or 7, in that noise-pulse-induced false handshakes can cause either the initiator 10 or the target devices 5, 6 and 7 to prematurely proceed to the next step of the handshaking data transfer protocol and thereby drop or lose a data sequence within a data block transfer.

By way of example and as illustrated in FIG. 3, in transferring a first data segment 40a from the disk drive 5 to the initiator 10 the drive 5 loads the first data segment 40a on to the data bus 15, pauses for the set-up time, and then asserts a REQ control signal 20 at time A. Next, the initiator 10 asserts the ACK control signal 30 at time B indicating that the initiator 10 has latched the first data segment 40a. Shortly thereafter at time C the drive 5 responds by deasserting the REQ control signal 20 for removing the first data segment 40a from the bus 15. However, when a noise pulse 35 or signal affects the ACK signal 30, as illustrated in FIG. 3, the noise pulse 35 erroneously appears to the disk drive 5 as a deassertion of the ACK control signal 30 by the initiator 10 at time E. This noise pulse 35 occurs prior in time to a nominal deassertion of the ACK control signal 30 by the initiator 10 as at time D (See FIG. 2).

The disk drive 5 then loads a second data segment 40b on the data bus 15 for subsequent transfer to the initiator 10. Meanwhile, despite the presence of the noise pulse 35 on the ACK line, the initiator 10 still has not actually deasserted the ACK control signal 30 associated with the first data segment 40a being transferred and associated therewith. However, the disk drive 5 detects the noise pulse 35 as an asserted ACK control signal 30 associated with the first data segment 40a and erroneously associates this ACK control signal 30 as an acknowledgment by the initiator 10 that it has latched the second data segment 40b at time Z, FIG. 3. Even though the initiator 10 has not latched the second data segment 40b, the disk drive 5 continues on with the handshaking protocol by deasserting the REQ control signal 20 associated with the second data segment 40b at time Y for removing the second data segment 40b from the bus 15. The initiator 10 then deasserts the ACK control signal 30 at time D, which the initiator believes to be associated with the first data segment 40a, in anticipation of the disk drive 5 sending a second data segment 40b. However, in response to the noise pulse 35 on the ACK path 30 the disk drive 5 has already loaded and removed the second data segment 40b from the bus 15.

Therefore, the drive 5 erroneously loads a third data segment 40c onto the data bus 15, pauses for the set-up time and asserts the REQ control signal 20 associated therewith at a time F. The initiator 10 then asserts ACK at a time G, and so forth.

Since the initiator 10 missed detecting the second data segment 40b, the initiator 10 will detect subsequent data segments transferred by the disk drive 5 with a one-data-segment 40 shift. This error condition results in the data bus 15 hanging up (stops responding) after the last data segment 40 has been transferred by the disk drive, because the initiator 10 continues to expect one more data segment to be transferred in order to complete the block transfer. Generally, during transfer of data segments 40 from the disk drive 5 to the initiator 10, a plurality of errors can occur as a result of noise pulses 35 being introduced to either the REQ control signal 20 or the ACK control signal 30 from a variety of sources and causes.

Referring to FIG. 4, in order to commence the transfer of a first data segment 40a from the initiator 10 to the drive 5, the drive 5 asserts a REQ control signal 20b at a time H. In this instance, the REQ control signal 20b is redefined as a request from the disk drive 5 for data 40 from the initiator 10. In response, the initiator 10 loads the first data segment 40a on the bus 15 at a time J and then pauses for the set-up time before sending the disk drive 5 an ACK control signal 30b at a time K. In this instance, the ACK control signal 30b is redefined as a signal indicating to the disk drive 5 that a data segment 40 is ready to be transferred to thereto. Shortly thereafter the drive 5 responds by deasserting the REQ control signal 20b at a time L, which is also redefined in this context to indicate to the initiator 10 that the drive 5 has latched or is in possession of the first data segment 40a. Thereafter the initiator 10 deasserts the ACK control signal 30b at a time M for removing the first data segment 40a from the data bus 15. The above described process steps are cyclically repeated for each successive data segment 40 loaded on the data bus 15 by the initiator 10 for transferring a plurality of data segments 40 from the initiator 10 to the disk drive 5 during a data block transfer.

Referring to FIG. 5, by way of further example, in transferring a first data segment 40a from the initiator 10 to the disk drive 5, the initiator 10 loads a first data segment 40a on the data bus 15 at time J, pauses for the set-up time and then asserts an ACK control signal 30b at time K. However, when a noise pulse or error signal 37 appears on the REQ control signal path 20b, as illustrated in FIG. 5, the noise pulse 37 erroneously appears to the host 10 as a deassertion of the REQ control signal 20b executed by the disk drive 5. As a result, the initiator 10 follows the protocol by prematurely deasserting the ACK control signal 30b at a time P, for removing the first data segment 40a from the data bus 15.

Additionally, the falling edge of the noise pulse 37 erroneously appears as a second assertion of the REQ control signal 20b. This erroneous second assertion of the REQ control signal 20b results in the initiator 10 loading a second data segment 40b onto the data bus 15. Even though the disk drive 5 did not actually request the second data segment 40b, the initiator 10 asserts the ACK control signal 30b at a time Q, indicating to the disk drive 5 that a second data segment 40b, as erroneously requested, is ready for transfer to the disk drive 5. Thereafter, the disk drive 5 deasserts the REQ control signal 20b at a time R, which the drive 5 associates with the first data segment 40a, for latching the second data segment 40b. Next, the initiator deasserts the ACK control signal 30b at a time S in order to remove the second data segment 40b from the data bus 15 and to return the bus 15 to an idle state.

In the absence of further noise disturbances introduced to the REQ control signal 20b, the handing shaking protocol is cyclically repeated for transferring subsequent data segments 40 from the initiator 10 to the disk drive 5. However, these subsequent data segments 40 transferred to the disk drive 5 will have a one-data-segment shift. The one-data-segment shift is a direct result of the disk drive 5 initially requesting a first data segment 40a, but actually receiving the first segment 40a and the second segment 40b. This one-data-segment shift causes the data bus 15 to hang upon completion of the data segment 40 transfers.

Generally, when transferring data segments 40 from the initiator 10 to the disk drive 5, a plurality of errors can accumulate as a result of these noise pulses 35 being introduced to either the REQ control signal 20b (FIG. 3) or noise pulses 37 being introduced into the ACK control signal 30b (FIG. 5).

Therefore, a hitherto unsolved need has remained for a method and circuit for detecting handshaking protocol errors occurring during asynchronous transfer of data segments over a data bus. Moreover, a need exists for a method and a circuit that communicates these detected handshaking protocol errors to the sending party, in order to enable a subsequent retry of the data transmission.

SUMMARY OF THE INVENTION

An object of the present invention is to monitor a data bus and detect data transfer protocol errors that occur during asynchronous transfer of data over the bus in a manner that overcomes limitations and drawbacks of the prior art.

Another object of the present invention is to communicate a detected handshaking protocol error to either the initiator, e.g. host computer, or the target, e.g. a disk drive, so that a subsequent retry of the data transmission can be attempted.

One more object of the present invention is to provide a detector logic arrangement for detecting errors occurring in a handshake transfer protocol having a plurality of states which are progressively reached during a data transfer handshaking protocol, such that states which are reached out of order indicate the presence of protocol errors on the bus.

In accordance with principles of the present invention, a detector circuit is provided for detecting data transfer protocol errors. The circuit generally monitors the REQ and ACK control lines of the data bus to detect if the control values associated therewith have entered into an undefined logical state. As a nominally correct sequence of REQ and ACK signals are detected on the bus, corresponding states of the error detector circuit remain benign. If a state is reached out of sequence, a handshake protocol error has occurred, and this condition is detected by the detector circuit and may then be signaled to the sending device to enable a data transfer retry.

In one preferred embodiment, a circuit for detecting data transfer protocol errors of the present invention comprises a pair of logical flip-flops, including a first flip-flop logical circuit having a data input D for receiving a REQ control value from the data bus via an inverter. The first flip-flop further includes a clock input which receives an ACK control value from the data bus. The first flip-flop is advanced one clock cycle for each detected rising edge of the ACK control value, and provides a first output value from a non-inverting (Q) output. Additionally, the circuit for detecting data transfer protocol errors includes a second flip-flip logical circuit having an input D for receiving the REQ control value from the data bus. The second flip-flop also has an inverting clock input for receiving the ACK control value from the data bus. With its inverted clock input the second flip-flop is advanced one clock cycle at each falling edge of the ACK control value. The second flip-flop provides a second output value from a non-inverting (Q) output.

If ACK goes high while REQ is low, the first flip-flop puts out an error condition. If REQ is high when ACK goes low, the second flip-flop puts out an error condition. An OR-gate logical circuit receives the output values from the first flip-flop and the second flip-flip and puts out an error value whenever either flip-flop output is true. This error value is communicated to the disk drive controller so that the disk drive can retry the data transmission operation. An alternative preferred embodiment of error detector circuit, preferably for use at a host or initiator unit, provides a complementary error detection capability. If REQ goes false while ACK is false a first flip-flop generates an error signal. If REQ goes true while ACK is true, a second flip-flop generates an error signal. An OR-gate then passes either error signal to the host or initiator unit.

These and other objects, advantages, aspects and features of the present invention will be more fully understood and appreciated upon consideration of the following detailed description of a preferred embodiment, presented in conjunction with the accompanying drawings.

DETAILED DESCRIPTION OF A PREFERRED EMBODIMENT

Figure 1:
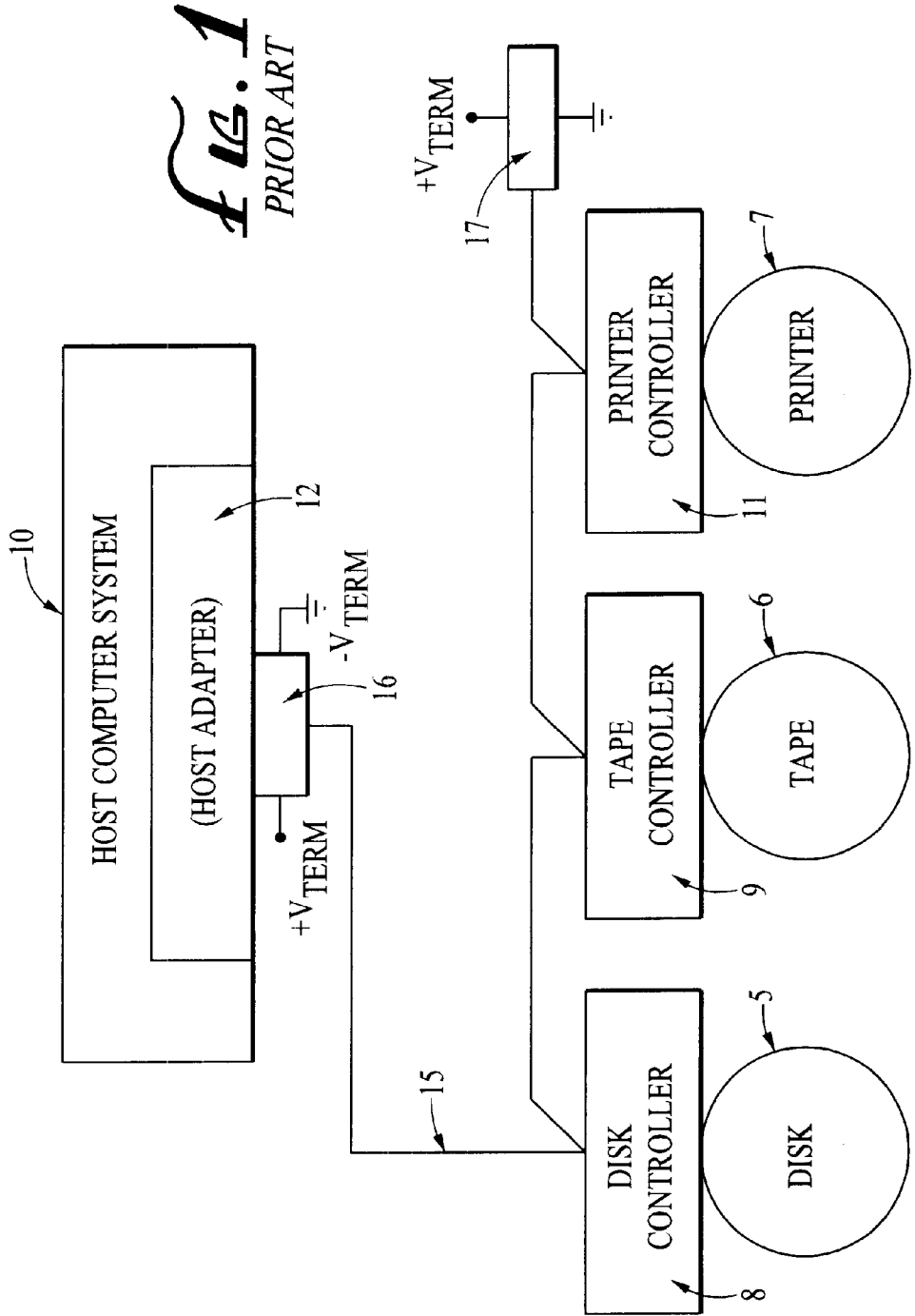
FIG. 1 is a block diagram of a host computer system.
Figure 2:
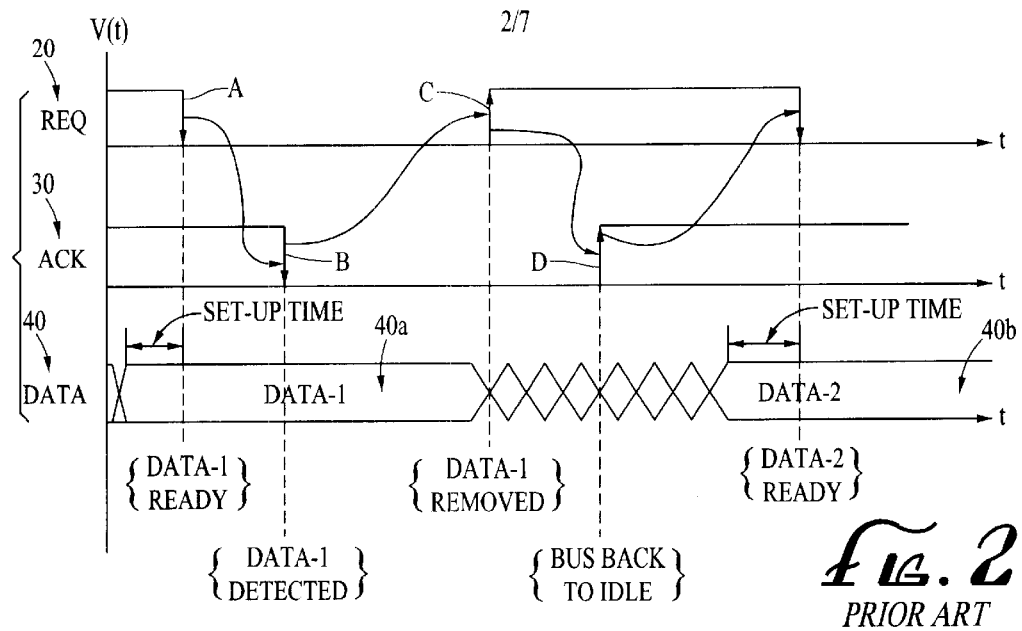
FIG. 2 is a signal flow diagram illustrating REQ, ACK, and Data signals conventionally transmitted over a data bus when transferring data from a target device to an initiator device according to a handshaking protocol.
Figure 6:
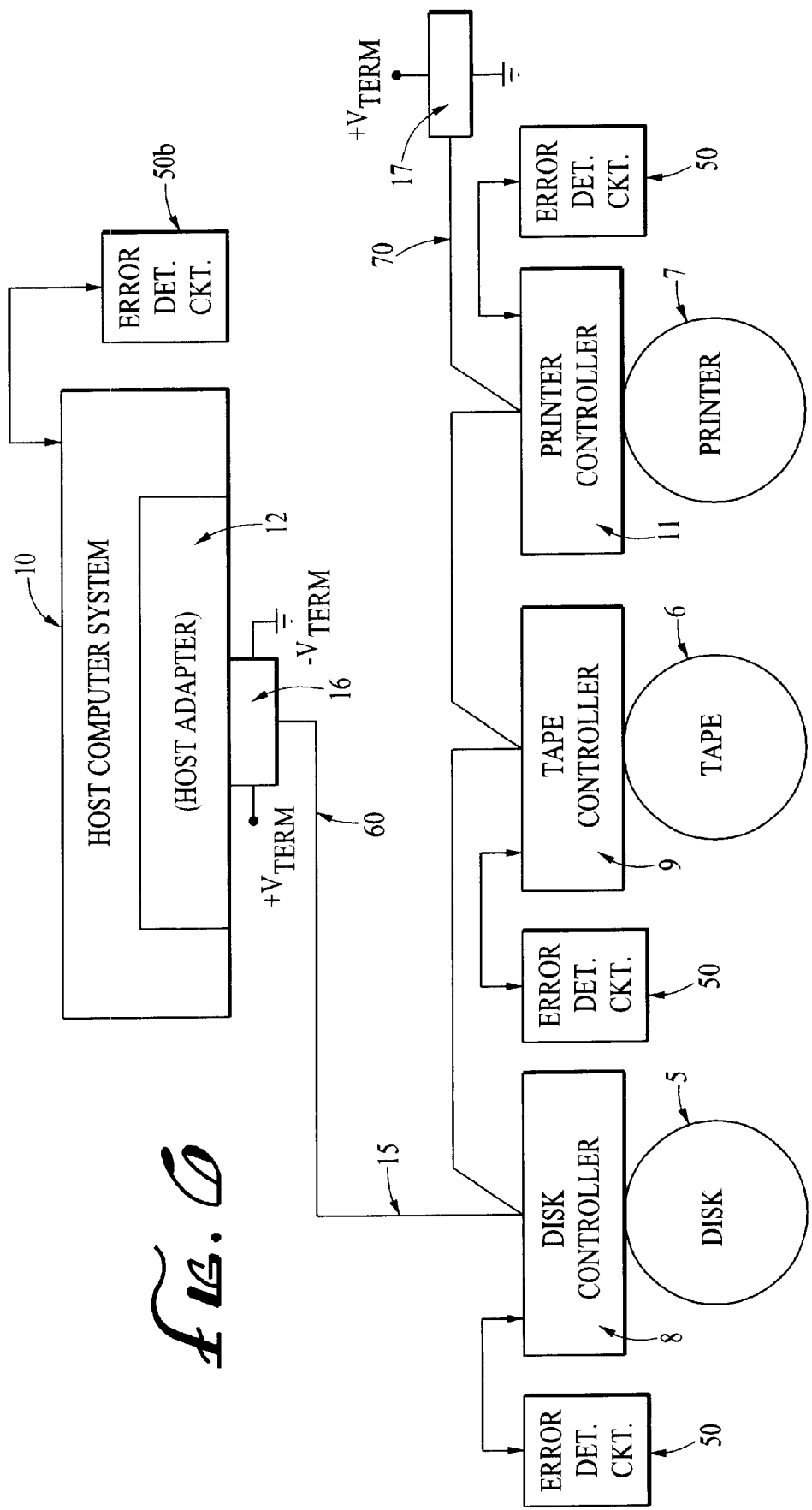
FIG. 6 is a block diagram of a host computer system incorporating a preferred embodiment of the present invention.

Referring to FIG. 6, in which elements remaining unchanged from the FIG. 1 example carry the same reference symbols, an error detection circuit 50 provides one preferred embodiment of the present invention for detecting data transfer protocol errors transmitted over the data bus 15. The data bus 15 has a proximate end 60 connected via a terminator 16 to an initiator or host computer 10 via a host adapter 12. The data bus 15 further has a distal end 70 connected to a terminator 17. A plurality of target devices, 5, 6 and 7, are daisy chained together along the bus 15 between the proximal end and the distal end thereof. Target devices 5, 6 and 7 may include any type of peripheral device such as a disk drive 5, tape drive 6, or a printer 7, etc. Most preferably the terminators 16 and 17 are active terminators. A target error detection circuit 50 (FIG. 7) is coupled with each of these target devices 5, 6 and 7 while an initiator error detection circuit 50b (FIG. 8) is coupled with the host computer 10.

Figure 3:
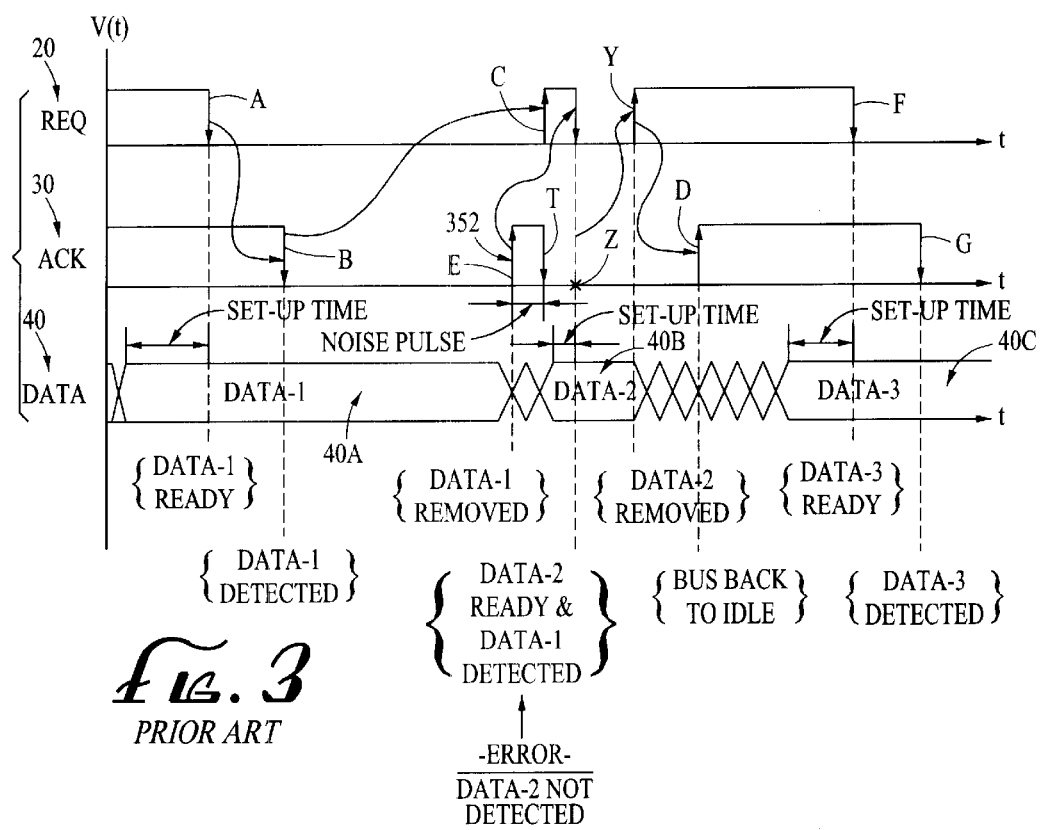
FIG. 3 is a signal flow diagram illustrating the FIG. 2 REQ control signal reacting to a noise pulse or disturbance introduced to the ACK control signal, and the resultant erroneous Data signals conventionally transmitted over a data bus according to the handshaking protocol.
Figure 4:
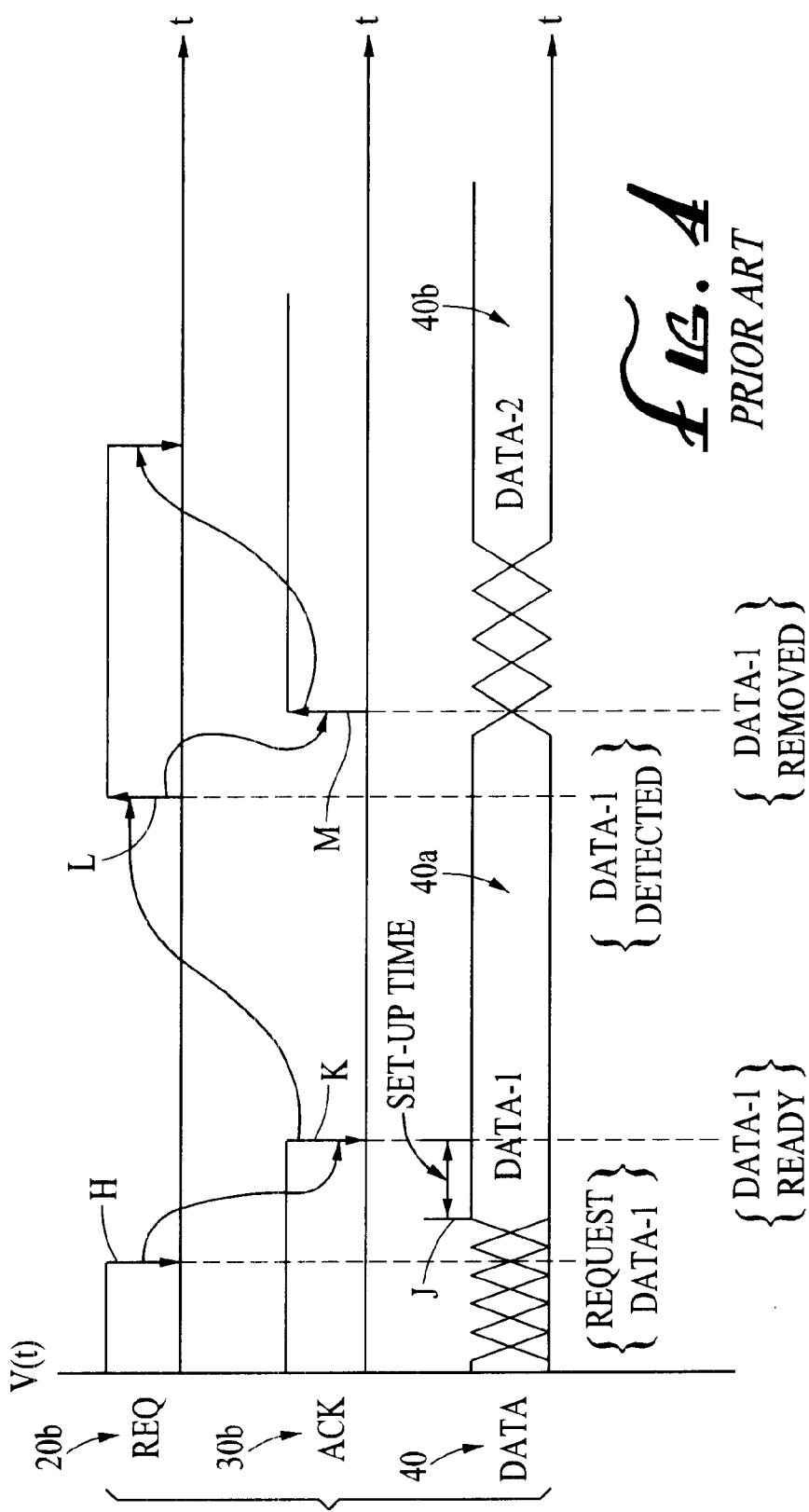
FIG. 4 is a signal flow diagram illustrating REQ, ACK, and Data signals conventionally transmitted over a data bus when transferring data from an initiator device to a target device according to the handshaking protocol.
Figure 7:
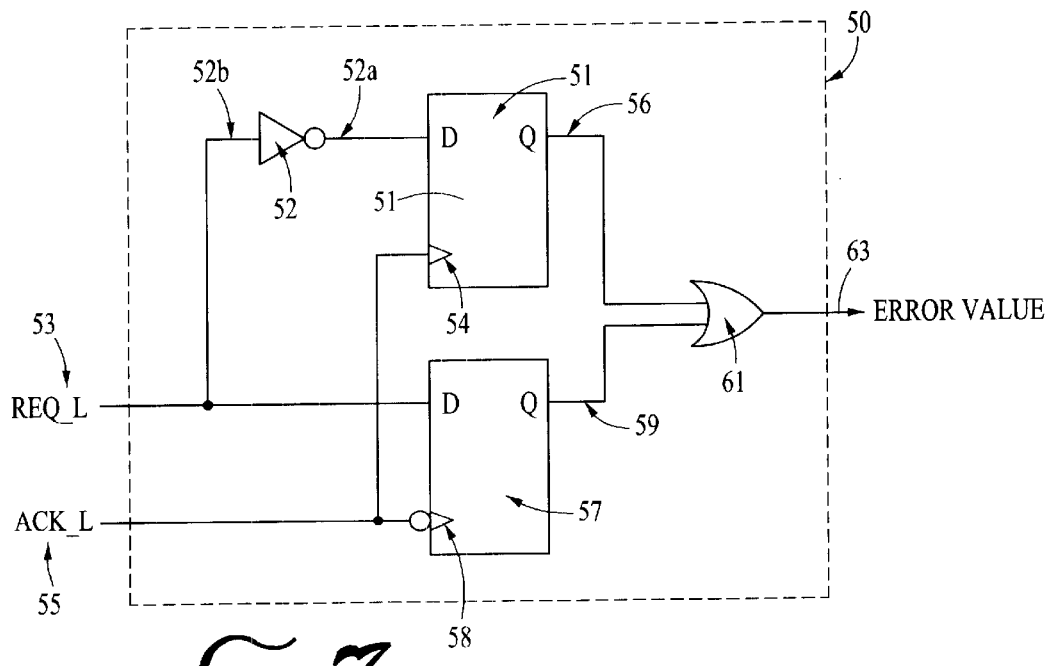
FIG. 7 is a detailed view of one embodiment of the error detection circuit of the present invention for use at a target device, such as a peripheral storage device.
Figure 9:
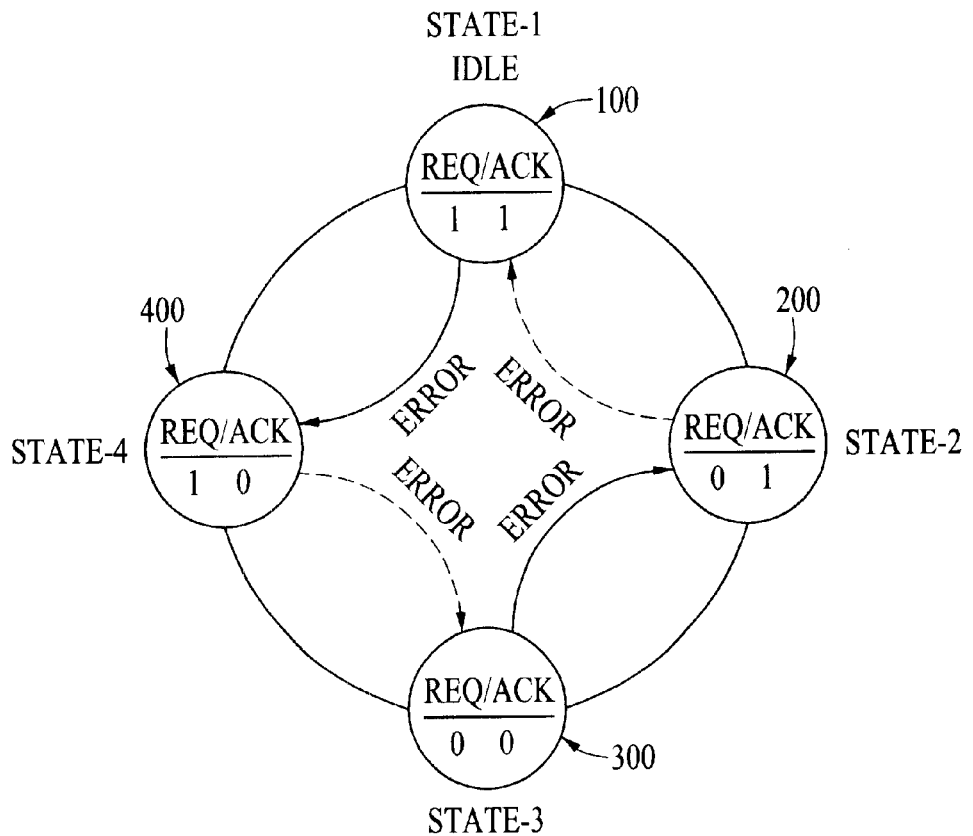
FIG. 9 is a state diagram illustrating four progressive logical states of the REQ and ACK control signals one complete cycle of the handshaking protocol and illustrating error progressions detected by the FIG. 7 detector and by the FIG. 8 error detector.

Referring to FIG. 7, one preferred embodiment of the error detection circuit 50, which is connected to the device controllers 8, 9, and 11 (FIG. 6), includes a first D-type flip-flop logical circuit 51. The first flip-flop 51 has a data input D which is coupled with the data bus 15 via an inverter 52. More precisely, the first flip-flop 51 is coupled with the inverting terminal 52a of the inverter 52, where the non-inverting terminal 52b of the inverter 52 is coupled with the data request (REQ) control line 53 of the data bus 15. Thus, the D input of the first flip-flop 51 receives a logical inverse of the REQ control value 20 (FIG. 3) over the REQ control line 53 from the data bus 15. Additionally, the first flip-flop 51 has a non-inverting clock input 54. The clock input 54 is coupled with the acknowledge (ACK) control line 55 defined within the data bus 15. The ACK control line 55 provides the clock input 54 with an ACK control value 30 (FIG. 3). The clock input 54 is responsive to this ACK control value 30 in that the first flip-flop 51 is advanced one clock cycle for each detected rising edge of the ACK control value 30. Each time the clock 54 is advanced one clock cycle, the first flip-flop 51 provides an updated first output value on a non-inverting (Q) output line 56. With reference to FIGS. 3 and 9, the output line 56 becomes true if the ACK line goes high while the REQ line remains low, a condition representing detection of an error pulse having a rising edge shown at time E in FIG. 3 (a FIG. 9 state-3 to state-2 error sequence).

The target error detection circuit 50 further includes a second flip-flop 57 logical circuit. The second flip-flop 57 has a D input coupled directly with the REQ control line 53 defined within the data bus 15. The second flip-flop 57 receives a REQ control value 20 over the REQ control line 53 from the data bus 15. An inverting clock input of the second flip-flop 57 is directly coupled with the ACK control line 55 defined within the data bus 15. The ACK control line 55 provides the second clocking integrated circuit 58 with an ACK control value 30. The second flip-flop 57 is advanced one clock cycle for each detected falling edge of the ACK control value 30. Again, each time the clock input 58 sees a falling edge of the ACK control value, the second flip-flop 57 provides an updated second output value at a non-inverting (Q) output line 59. With reference to FIGS. 3 and 9, if the ACK line goes low while the REQ line is high, a second error condition is present (a FIG. 9 state-1 to state-4 error sequence), and output line 59 becomes true.

The detector circuit 50 includes an OR-gate logical circuit 61 which has a first input connected to receive the first output value from the first flip-flop 51 over line 56, and which has a second input connected to receive the second output value from the second flip-flip 57 over line 59. Based on these output values provided by the flip-flops 51 and 57, the OR-gate 61 provides an output 63 which when true asserts an error value indicating detection of data transfer protocol errors transmitted over the data bus 15. In one instance, if the OR-gate 61 provides a value equivalent to a logic one, then a data transfer protocol error has been transmitted over the data bus 15.

Figure 5:
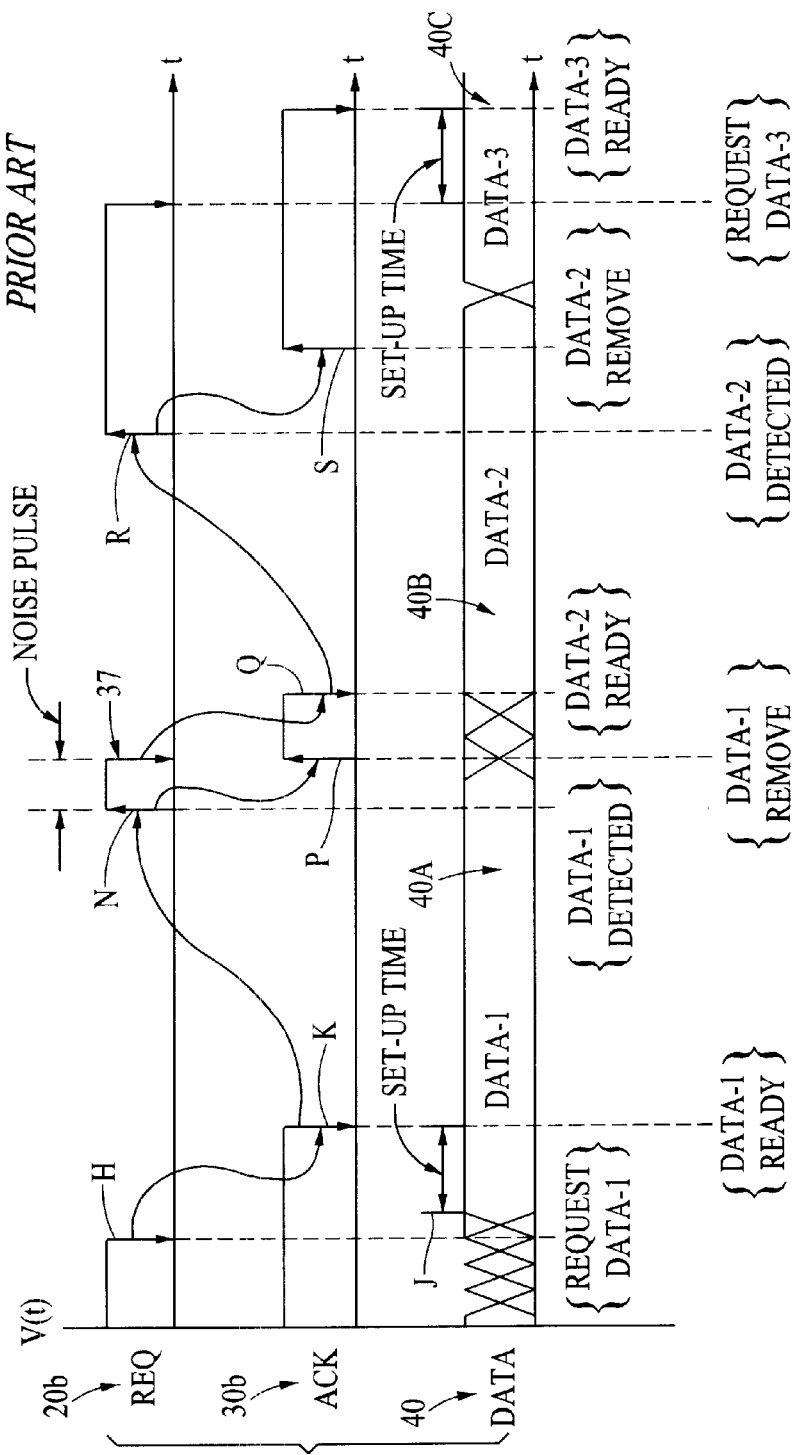
FIG. 5 is a signal flow diagram illustrating the ACK control signal reacting to a noise pulse or disturbance introduced to the REQ control signal, and the resultant erroneous Data signals conventionally transmitted over a data bus according to the handshaking protocol.
Figure 8:
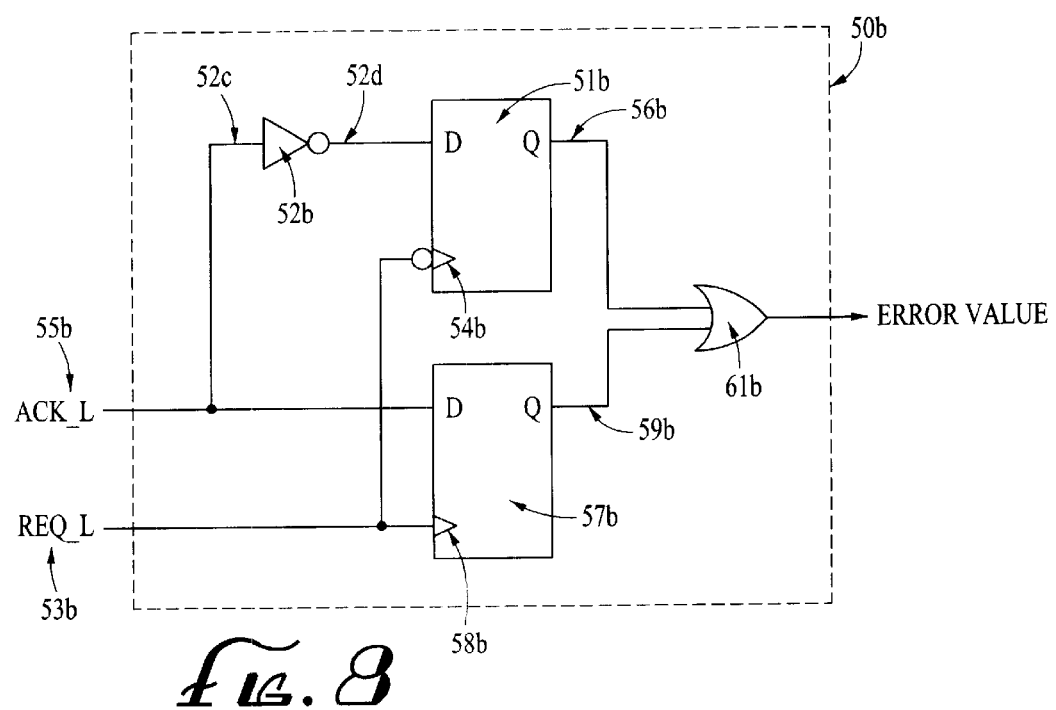
FIG. 8 is a detailed view of another embodiment of the error detection circuit of the present invention for use at an initiator device, such as a host.

A host error detector circuit 50b is shown in FIG. 8. The error detection circuit 50b is connected to the host computer 10 (FIG. 6) and it includes a first flip-flop logical circuit 51b. The first flip-flop 51b has D input of the first flip-flop 51b is coupled with the inverting terminal 52d of the inverter 52b, where the non-inverting terminal 52c of the inverter 52b is coupled with the acknowledge (ACK) control line 55b defined within the data bus 15. Thus, the D input of the first flip-flop 51b receives an inverse of the ACK control value 20b (FIG. 5) over the ACK control line 55b from the data bus 15. Additionally, the first flip-flop 51b has an inverting clock input 54b. The inverting clock input 54b is coupled with the data request (REQ) control line 53b of the data bus 15. The first flip-flop 51b is advanced one clock cycle for each detected falling edge of the REQ control value 30b. Each time the first flip-flop is advanced one clock cycle, the first flip-flop 51b provides an updated first output value at a non-inverting (Q) output on line 56b. With reference to FIGS. 5, 8 and 9, if the REQ line goes low while the ACQ line is low, an error condition is detected by the flip-flop 56b (a FIG. 9 state-4 to state-3 error sequence), and the output line 56b becomes true.

The error detection circuit 50b further includes a second flip-flop logical circuit 57b. The second flip-flop 57b has a D input coupled directly with the ACK control line 55 defined within the data bus 15. The second flip-flop 57b further includes a non-inverting clock input 58b coupled directly with the REQ control line 53b defined within the data bus 15. The REQ control line 53b provides the clock input 58b with the REQ control value 30b. The second flip-flop 57b is advanced one clock cycle for each detected rising edge of the REQ control value 30b. Again, each time the clock input 58b is advanced one clock cycle, the second flip-flop 57b provides an updated second output value at a non-inverting (Q) output on line 59b. With reference to FIGS. 8 and 9, if the REQ line goes high while the ACK line is high, an error condition is detected by the flip-flop 57b (a FIG. 9 state-2 to state 1 error sequence), and the output line 59b becomes true.

An OR-gate integrated circuit 61b receives the first output value from the first flip-flop 51b over line 56b as well as the second output value from the second flip-flip 57b over line 59. Based on these output values provided by the flip-flops 51b and 57b, the OR-gate 61b provides an updated error value indicative of data transfer protocol errors transmitted over the data bus 15. In one instance, if the OR-gate 61b provides a value equivalent to a logic one, then a data transfer protocol error has been transmitted over the data bus 15.

Referring to FIGS. 6–9, during operation of the FIGS. 7 and 8 error detection circuits 50 and 50b respectively, both the REQ 53 and the ACK 55 control lines of the data bus 15 are monitored to detect an error state thereon. Accordingly, the error detection circuit 50 is connected to the device controllers 8, 9, and 11 for detecting if the control lines 53 and 55 enter an error state when a data transfer is occurring between any of the target devices 5, 6, or 7 and the host 10. Similarly, the error detection circuit 50b is connected to the host computer 10 for again detecting if the control lines 53 and 55 enter an error state when a data transfer is occurring between any of the target devices 5, 6, or 7 and the host 10.

Referring to FIGS. 2–9, in one example of executing the previously described handshaking protocol for transferring data segments from a target device or disk drive 5 to an initiator or host computer 10, the REQ 53 and ACK 55 control lines of the data bus 15 begin from a first control state or idle state 100. In this idle state 100, both the REQ 53 and the ACK 55 control lines are at a logic one value as shown in FIG. 9 (bus idle). In commencing the handshaking protocol for transferring a first data segment from the disk drive 5 to the host 10, the REQ 53 and ACK 55 control lines are transitioned to a second control state 200. In transitioning from the first control state 100 to the second control state 200, the REQ control line 53 is transitioned from a logic one value to a logic zero value and the ACK line 55 is left unchanged at a logic one. This second control state 200 indicates that target unit 5 has positioned the first data segment on the data bus 15 and that the data segment thereof is ready for transfer to the initiator host 10. Shortly thereafter, the handshaking protocol transitions from the second control state 200 to a third control state 300. In doing so, the ACK control line 55 transitions from a logic one to a logic zero and the REQ control line 53 remains unchanged at a logic zero. This third control state 300 indicates that the first data segment put on the data bus 15 by the disk drive 5 has been latched or detected by the host computer 10. Moreover, the disk drive 5 is now permitted to remove the first data segment from the data bus 15. Accordingly, the protocol transitions from the third control state 300 to a fourth control state 400. In transitioning from the third control state 300 to the fourth control state 400, the REQ control line 53 transitions from a logic zero to a logic one and the ACK control line 55 remains unchanged at a logic zero. This fourth control state 400 indicates that the disk drive 5 has removed the first data segment from the data bus 15, whereby the protocol then transitions back to the idle state 100 by transitioning the ACK control line 55 from a logic zero to a logic one and the REQ control line 53 remains unchanged at a logic one. The circular progression from the first state 100 to the second state 200 to the third state 300 to the fourth state 400 to the first state 100 indicates a nominal error-free handshaking protocol sequence.

Referring to FIGS. 3, 5, and 9, since the ACK control signal 30 is generated by the host 10, the error detection circuit 50, which is connected to the device controllers 8, 9, and 11, detects ACK control signal 30 protocol errors received by the device controllers 8, 9, and 11. More precisely, if the noise pulse 35 is introduced to the ACK control signal 30, the first 100 and third 300 control states can transition to an undefined or illegal control state that results in data transmission errors. In referring to the first control state or idle state, both the REQ 53 and ACK 55 control lines are at a logic one. However, if the ACK control line 55 is affected by a noise pulse that causes the ACK control line 55 to transition from the logic one to a logic zero, an erroneous control state is entered as shown in FIG. 9 as an error sequence from the first state 100 to the fourth state 400. Similarly, in referring to the third control state 300, both the REQ 53 and ACK 55 control lines are at a logic zero, but if a noise pulse causes the ACK control line 55 to transition from a logic zero to a logic one, an erroneous control state from the third control state 300 to the second control state 200 is entered. These two error sequences are shown by solid line arrows in FIG. 9 and are detected by the detector 50, as explained above.

Again referring to FIGS. 3, 5, and 9, since the REQ control signal 20b is generated by the any one of the device controllers (targets) 8, 9, or 11, the error detection circuit 50b, which is, connected to the host 10, can detect REQ control signal 20b protocol errors received at the host 10. In particular, if the noise pulse 35 is introduced to the REQ control line (FIG. 5), the second 200 and fourth 400 control states can transition to an undefined or illegal control state that results in data transmission errors. In referring to the second control state 200, the REQ 53 and ACK 55 control lines are at a logic zero and a logic one respectively. However, if the REQ control line 53 is affected by a noise pulse that causes the REQ control line 53 to transition from the logic zero to a logic one, an erroneous control state is entered as shown in FIG. 9 (a progression from control state 200 to idle state 100). Similarly, in referring to the fourth control state 400, the REQ 53 and ACK 55 control lines are at a logic one and a logic zero respectively. However, if a noise pulse causes the REQ control line 53 to transition from a logic one to a logic zero, an erroneous control state is again entered (a progression from control state 400 to control state 300).

The FIG. 7 and 8 circuits of the present invention monitor the FIG. 9 states of the REQ 53 and ACK 55 control lines, which are defined within the data bus 15, to detect if the control lines 53 and 55 enter into the undefined states. Whenever an undefined state is entered, as illustrated in the FIG. 9 state diagram, a logic one value or error value is provided by the FIG. 7 and FIG. 8 circuits. This error value is communicated to the target device bus controller of devices 8, 9, or 11, or to a bus controller of the host 10 and indicates to the controller/host that the handshaking protocol has entered an undefined state. Upon receiving this error value, the bus controller at the target or the host can initiate actions that permit the target device 5 or the host initiator device 10 to either retry the data transmission or to post an error flag for subsequent processing by higher layers of the communications system protocol existing between the devices.

The above described circuit for detecting data bus protocol errors has many advantages over the prior art, such as, providing path for notifying the disk drive controller or host that the handshaking protocol has entered an erroneous state. As a result, the target device bus controller or host bus controller can retry the data segment transfer until it is successfully completed. The FIGS. 7 and 8 circuits may be formed of individual logical components, or most preferably, these circuits may be included as parts of larger scale application specific bus interface and driver circuits within the target devices 8, 9 and 11 and host 10.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A Circuit Arrangement for detecting data transfer protocol errors transmitted over a data bus between a sending unit and a receiving unit in accordance with a predetermined handshaking protocol, the bus including data lines for data transmission, a request line and an acknowledge line separate from the data lines for said handshaking protocol, the handshaking protocol on the request line and the acknowledge line having a logical sequence 11, 01, 00, 10, and returning to 11, and including a first detector circuit connected to monitor the request line for error events occurring on the acknowledge line and including a first logic circuitry for detecting a first erroneous sequence from 11 to 10, and for detecting a second erroneous sequence from 00 to 01, and for putting out an error condition indication upon detection of one of the first erroneous sequence and the second erroneous sequence.

2. The circuit arrangement set forth in claim 1 wherein the first logic circuitry comprises:
   a first flip-flop having an input coupled to an inverter, the inverter being coupled to the request line, a non-inverting clock input coupled to the acknowledge line, and a first non-inverting output,
   a second flip-flop having an input directly coupled to the request line, an inverting clock input coupled to the acknowledge line, and a second non-inverting output, and
   first selector means for selecting either the first non-inverting output or the second non-inverting output as an error condition whenever either output is true.

3. The circuit arrangement set forth in claim 2 wherein the first and second flip-flops comprise D-type flip-flops, and wherein the first selector means comprises an OR-gate.

4. The circuit arrangement set forth in claim 1 wherein the data bus follows a Small Computer System Interface (SCSI) protocol and wherein the first logic circuitry is associated with a SCSI target device coupled to the data bus.

5. A Circuit Arrangement for detecting data transfer protocol errors transmitted over a data bus between a sending unit and a receiving unit in accordance with a predetermined handshaking protocol, the bus including data lines for data transmission, a request line and an acknowledge line separate from the data lines for said handshaking protocol, the handshaking protocol on the request line and the acknowledge line having a logical sequence 11, 01, 00, 10, and returning to 11, and including a second detector circuit connected to monitor the acknowledge line for error events occurring on the request line and including a first logic circuitry for detecting a third erroneous sequence from 01 to 11, and for detecting a fourth erroneous sequence from 10 to 00, and for putting out an error condition indication upon detection of one of the third erroneous sequence and the fourth erroneous sequence.

6. The circuit arrangement set forth in claim 5 wherein the second logic circuitry comprises:
   a third flip-flop having an input coupled to an inverter, the inverter being coupled to the acknowledge line, a non-inverting clock input coupled to the request line, and a first non-inverting output,
   a fourth flip-flop having an input directly coupled to the acknowledge line, an inverting clock input coupled to the request line, and a second non-inverting output, and
   second selector means for selecting either the first non-inverting output or the second non-inverting output as an error condition whenever either output is true.

7. The circuit arrangement set forth in claim 6 wherein the third and fourth flip-flops comprise D-type flip-flops, and the second selector means comprises an OR-gate.

8. The circuit arrangement set forth in claim 6 wherein the data bus follows a Small Computer System Interface (SCSI) protocol and wherein the second logic circuitry is associated with a SCSI initiator device coupled to the data bus.

9. The circuit arrangement set forth in claim 8 wherein the data bus is in accordance with a Small Computer System Interface (SCSI) protocol, wherein the first detector circuitry is associated with a SCSI target device coupled to the data bus, and wherein the second detector circuitry is associated a SCSI initiator device coupled to the data bus.

10. A Circuit Arrangement for detecting 11 data transfer protocol errors transmitted over a data bus between a sending unit and a receiving unit in accordance with a predetermined handshaking protocol, the bus including date lines for data transmission, a request line and an acknowledge line separate from the data lines for said handshaking protocol, the handshaking protocol on the request line and the acknowledge line having a logical sequence 11, 01, 00, 10, and returning to 11, and including a first detector circuit connected to monitor the request line for error events occurring on the acknowledge line and including a first logic circuitry for detecting a first erroneous sequence from 11 to 10, and for detecting a second erroneous sequence from 00 to 01, and for putting out an error condition indication upon detection of one of the first erroneous sequence and the second erroneous sequence, and further including a second detector circuit connected to monitor the acknowledge line for error events occurring on the request line and including a first logic circuitry for detecting a third erroneous sequence from 01 to 11, and for detecting a fourth erroneous sequence from 10 to 00, and for putting out an error condition indication upon detection of one of the third erroneous sequence and the fourth erroneous sequence.

11. The circuit arrangement set forth in claim 10 wherein the first logic circuitry comprises:

a first flip-flop having an input coupled to an inverter, the inverter being coupled to the request line, a non-inverting clock input coupled to the acknowledge line, and a first non-inverting output, a second flip-flop having an input directly coupled to the request line, an inverting clock input coupled to the acknowledge line, and a second non-inverting output, and first selector means for selecting either the first non-inverting output or the second non-inverting output as an error condition whenever either output is true;

and wherein the second logic circuitry comprises:

a third flip-flop having an input coupled to an inverter, the inverter being coupled to the acknowledge line, a non-inverting clock input coupled to the request line, and a first non-inverting output, a fourth flip-flop having an input directly coupled to the acknowledge line, an inverting clock input coupled to the request line, and a second non-inverting output, and second selector means for selecting either the first non-inverting output or the second non-inverting output as an error condition whenever either output is true.

12. The circuit arrangement set forth in claim 10 wherein the first, second, third and fourth flip-flops comprise D-type flip-flops, and wherein the first and second selector means each comprises an OR-gate.

13. A method for detecting data transfer protocol errors transmitted over a data bus between a sending unit and a receiving unit in accordance with a predetermined handshaking protocol, the bus including data lines for data transmission, a request line and an acknowledge line separate from the data lines for said handshaking protocol, the handshaking protocol on the request line and the acknowledge line having a logical sequence 11, 01, 00, 10, and returning to 11, the method including the steps of:

monitoring the request line for error values occurring on the acknowledge line, detecting a first erroneous sequence of true or false (1 to 0) on the acknowledge line while the request line remains true (1), detecting a second erroneous sequence of false to true (0 to 1) on the acknowledge line while the request line remains false (0), and putting out an error condition to a data sending unit on the bus indicating detection of one of the first erroneous sequence and the second erroneous sequence.

14. The method set forth in claim 13 comprising the further steps of:

monitoring the acknowledge line for error events occurring on the request line, detecting a third erroneous sequence of false to true (0 to 1) on the request line while the acknowledge line remains true (1), detecting a fourth erroneous sequence of true to false (1 to 0) on the request line while the acknowledge line remains false (0), and putting out an error condition to a data receiving unit on the bus indicating detection of one of the third erroneous sequence and the fourth erroneous sequence.

* * * * *